United States Patent [19]
Shimizu et al.

[11] Patent Number: 6,005,936
[45] Date of Patent: Dec. 21, 1999

[54] SYSTEM FOR EMBEDDING AUTHENTICATION INFORMATION INTO AN IMAGE AND AN IMAGE ALTERATION DETECTING SYSTEM

[76] Inventors: Shuichi Shimizu, 3-29-2-307, Shin-Ishikawa, Aoba-ku, Yokohama; Masayuki Numao, 3-22-11-1011, Kamiasao, Asao-ku, Kawasaki; Norishige Morimoto, 1-2-25-402, Ohkura, Tokyo, all of Japan

[21] Appl. No.: 08/918,163

[22] Filed: Aug. 25, 1997

[30] Foreign Application Priority Data

Nov. 28, 1996 [JP] Japan ................................ 8-317526

[51] Int. Cl.⁶ .................................................. H04L 9/00
[52] U.S. Cl. .............................. 380/4; 380/5; 380/23; 380/25; 380/49; 380/50; 380/54; 380/59; 382/100; 382/276
[58] Field of Search .................................... 380/3, 4, 5, 9, 380/23, 25, 29, 30, 49, 50, 54, 59, 7, 10; 382/100, 232, 276, 325

[56] References Cited

U.S. PATENT DOCUMENTS 5,499,294  3/1996  Friedman ................................. 380/10
5,848,155  12/1998  Cox ............................................ 380/4

FOREIGN PATENT DOCUMENTS 8-159330  6/1996  Japan .

OTHER PUBLICATIONS

English Abstract only of Japanses Patent Application 8–272721 that was Published Oct. 18, 1996.

*Primary Examiner*—Bernarr E. Gregory
*Attorney, Agent, or Firm*—Scully, Scott, Murphy & Presser; Tay P. Sbrollini, Esq.

[57] ABSTRACT

A digital camera for embedding authentication information to detect the identity of a photographed image into an image. By supplying the authentication information integrally with image data, the verifier is enabled to verify the image data without saving the authentication information. Particularly, by converting the light inputted through an optical system to an electric signal, a CCD outputs an analog signal of an image which is converted to a digital signal. In response to the digital signal of the image, a digital camera having a region dividing unit divides the digital image into first and second regions. Authentication information is generated from data in the first region, which information is then encrypted. The encrypted authentication information is embedded into the second image region. The first and second image regions are then combined.

13 Claims, 5 Drawing Sheets

SYSTEM FOR EMBEDDING AUTHENTICATION INFORMATION INTO AN IMAGE AND AN IMAGE ALTERATION DETECTING SYSTEM

BACKGROUND OF THE INVENTION

1. Technical Field

The present invention relates to a system for embedding a digest of an image, and particularly to a digital camera in which the authentication information of a photographed image is added to the image.

2. Prior Art

Recently, the digital camera has been rapidly coming into wide use. The digital camera is used to photograph a scene or the like and store it in a memory card or the like as digital data. The reason for the rapid wide use of the digital camera naturally resides in the reduction of the main unit's price and its excellent portability, but it is more important that the taken photograph can be held as a digital image. Digital data can easily be processed by a computer or the like with respect to its contents, and can easily be distributed through a network or the like. Accordingly, it is expected that the need for the digital camera which can simply provide such digital image will increasingly grow in the future.

On the other hand, since digital data is susceptible to alteration such as combination without any sign, the reliability of a photographed digital image as evidence may raise a problem. Such problem may not be often provided in the photograph taking as a hobby by general users, but it can become significant in the photograph taking for business purpose. For instance, there are cases in which a digital camera is used to provide a record of a construction work, and in which a photographed digital image is sent or received between the owner and the contractor through a network. In these cases, the identity of the contents of the photographed digital image must be detected before the digital image can exhibit the function as photographic evidence. Thus, there are large demands on a digital camera which can add authentication information on the identity of the photographed digital image.

FIG. 1 is a block diagram of the image processing system of the conventional digital camera. A photographed object is converted to an electric analog signal by a CCD 12 through an optical system 11. This signal is processed by a signal processing unit 13, and outputted as image data D which is a digital signal. The generated image data D is inputted to a digest calculating unit 14. The digest calculating unit 14 calculates a hash value H of the data of the whole image. The hash value is a value (digest) uniquely determined by a calculation based on the image data and showing the characteristics of the image. The hash value H as a digest depends on the image contents. An encrypting unit 15 encrypts the hash value H using a secret key SK, and outputs an encrypted hash value H'. This encrypted hash value H' is authentication information, which is attached as a file separate from the image data D.

To determine whether image data is the same as the original image data, in other words, whether the image data has been altered, the following kinds of information are required.

(1) Image data (2) Authentication information (attached to the image data as a separate file)

(3) Public key PK corresponding to the secret key (separately acquired from a person in authority)

To detect alterations, a hash value $H_1$ of the image data to be subjected to alteration detection is calculated. Then, a hash value $H_2$ is identified from the authentication information in the attached file. Since the authentication information is obtained by encrypting the hash value H of the original image D by the secret key SK (hash value H'), the hash value $H_2$ cannot be identified by the authentication information itself. Thus, the public key PK is acquired from a person in authority who is keeping the public key PK corresponding to the secret key SK, and the authentication information is decoded based on this. Then, the obtained hash value $H_2$ is compared with the calculated hash value $H_1$. If the image as the object to be subjected to the alteration detection is the same as the original image D, the values of both must be the same. It is because the hash value as a digest must have a different value if the image contents are different. Accordingly, if the hash values are the same, it is determined that the identity is detected; otherwise it is determined that there has been an alteration.

As described above, in the identification detection in the background art, authentication information is attached separately from image data, and the alteration detection is performed on the assumption that the authentication information is attached when the verification is carried out. Accordingly, in the absence of the authentication information, the verification cannot be made any more. Thus the verifier must pay close attention to the storage and management of the authentication information.

SUMMARY OF THE INVENTION

Accordingly, it is an object of the present invention to propose a novel system in which authentication information can be supplied integrally with image data.

Further, it is another object of the present invention to enable image data to be verified without requiring the storage of authentication information by the verifier.

Furthermore, it is another object of the present invention to embed authentication information into an image without degrading the picture quality of image data.

More specifically, the present invention is directed to a system for embedding authentication information into one means of an image, the system having region dividing means for dividing the image into a first image region and a second image region, authentication information generating means for generating the authentication information from data in the first image region, hiding means for embedding the authentication information into the second image region by operating the data in the second image region, and region combining means for combining the first image region in the image with the second image region in which the authentication information is embedded.

The present invention is further directed to an image alteration detecting system having region identifying means for identifying a first image region and a second image region in an image, the second image region including information embedded by operating data, authentication information generating means for generating first authentication information from data in the first image region, extracting means for extracting second authentication information from the second image region, and alteration detecting means for determining, if the first authentication information is the same as the second authentication information, that there is no alteration in the image, and determining, if they are not the same, that there is alteration in the image.

The present invention further provides a method for embedding authentication information into one means of an image, the method having a step of dividing the image into a first image region and a second image region, a step of generating the authentication information from data in the first image region, a step of embedding the authentication information into the second image region by operating data in the second image region, and a step of combining the first image region in the image with the second image region in which the authentication information is embedded.

Still further, the present invention is directed to an alteration detecting method for the identity of an image, the method having a step of identifying a first image region and a second image region in the image the second image region including information embedded by operating data, a step of generating first authentication information from data in the first image region, a step of extracting second authentication information from the second image region and a step of determining, if the first authentication information is the same as the second authentication information, that there is no alteration in the image.

In such construction the (second) authentication information is embedded into the second image region. The (second) authentication information is information for detecting the identity of the image, which uniquely depends on the contents of the first image region. If there is alteration in the data in the first image region, the first authentication information generated based on the altered data has a value different from the second authentication information embedded in the second image region. Accordingly, by extracting the second authentication information embedded in the second image region, and comparing it with the first authentication information newly generated from the first image region, a verification can be made as to whether or not the image has alteration.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

Figure 1:
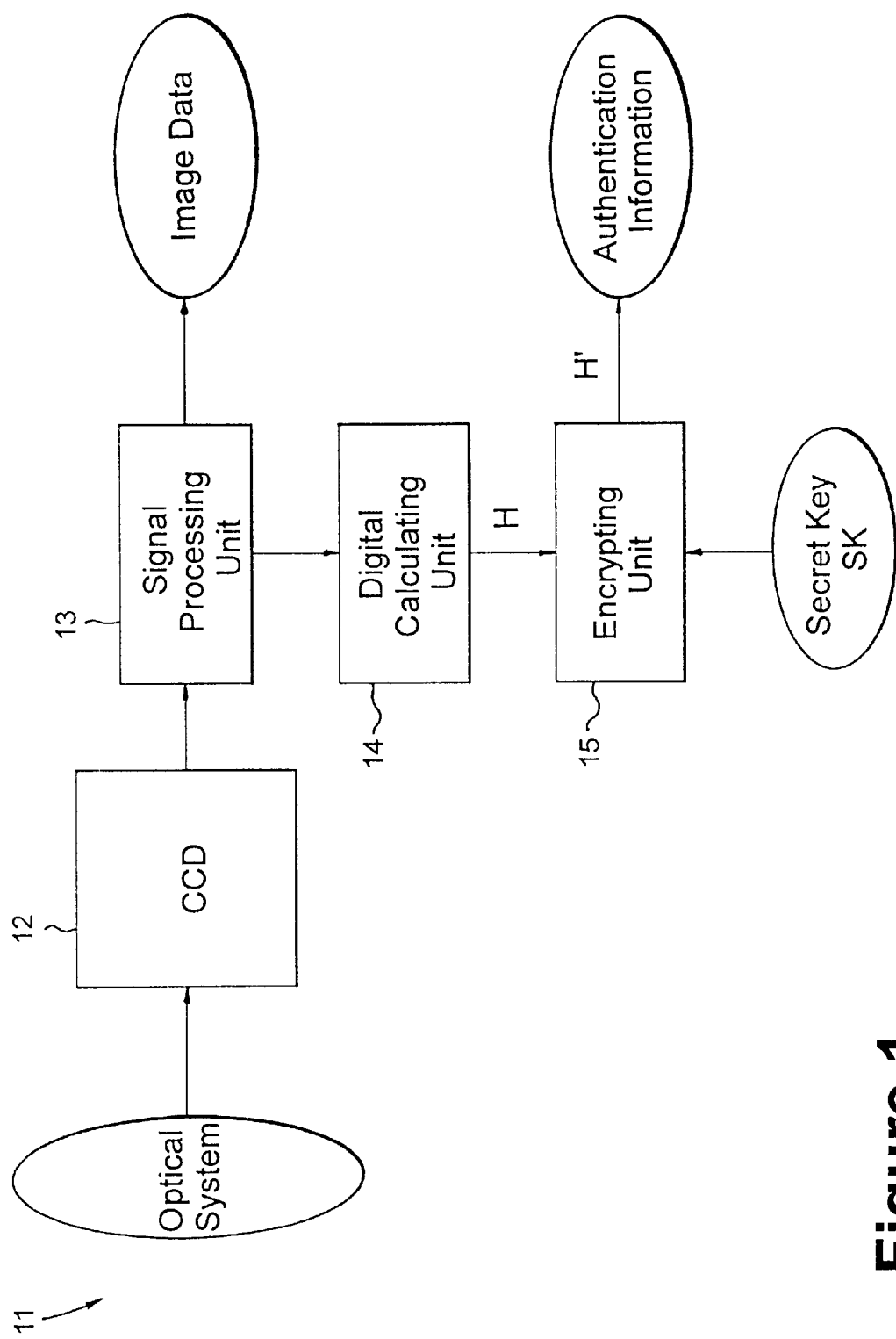
FIG. 1 is a block diagram of the image processing system of the conventional digital camera.
Figure 2:
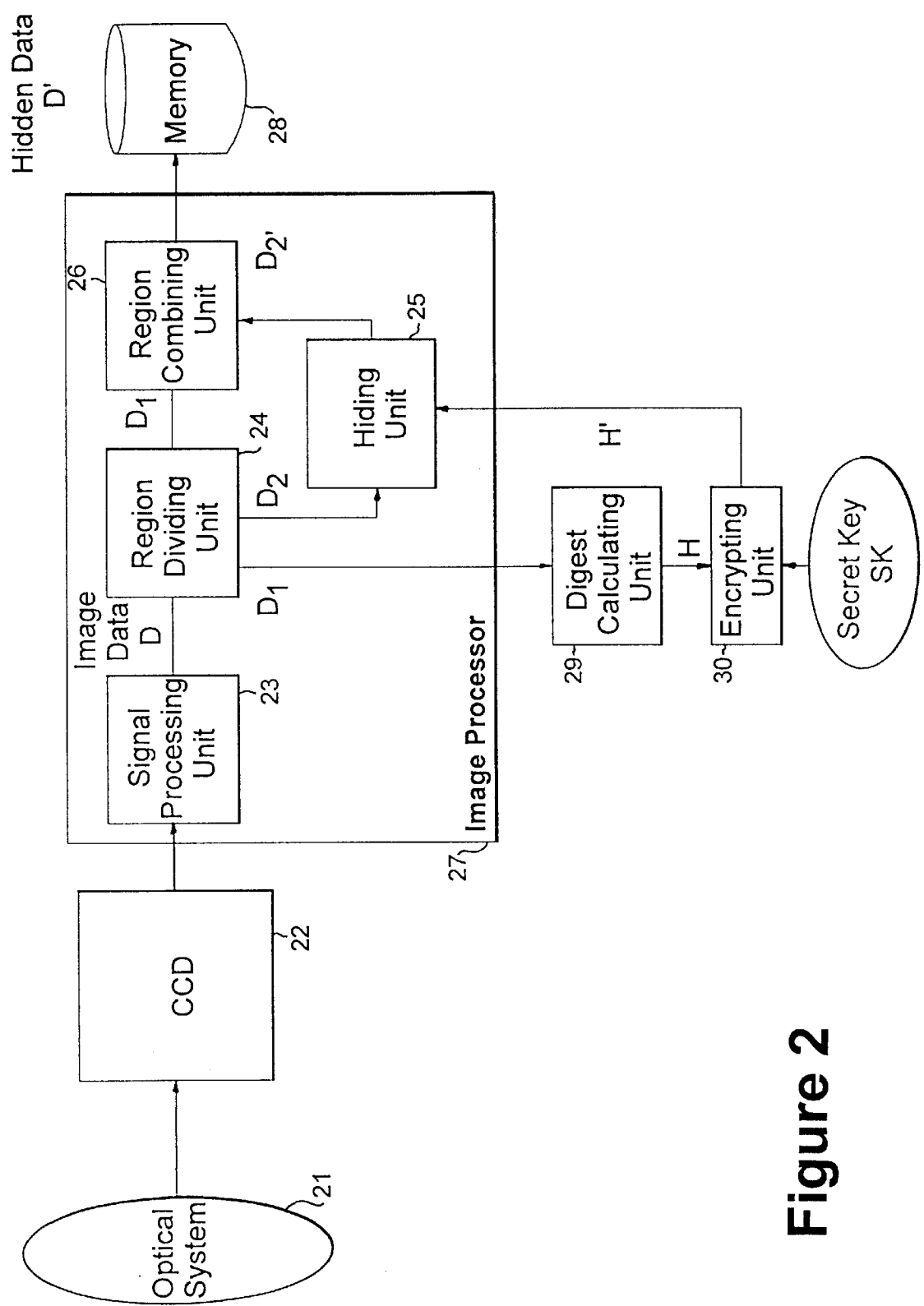
FIG. 2 is a block diagram of the image processing system of the digital camera in the embodiment.

FIG. 2 is a block diagram of the image processing system of the digital camera in this embodiment. A photographed object is connected to an electric analog signal by a CCD 22 through an optical system. This signal is processed by an image processor 27 having a signal processing unit 23, a region dividing unit 24, a hiding unit 25, and a region combining unit 26, and it is outputted as image data D' which is a digital signal, and stored in a memory 28 such as a memory card. Since this image data D' includes a hash value embedded in a predetermined image region in image data D by the hiding unit 25, it is not completely the same data as the image data D though the difference cannot be visually discriminated.

Figure 3:
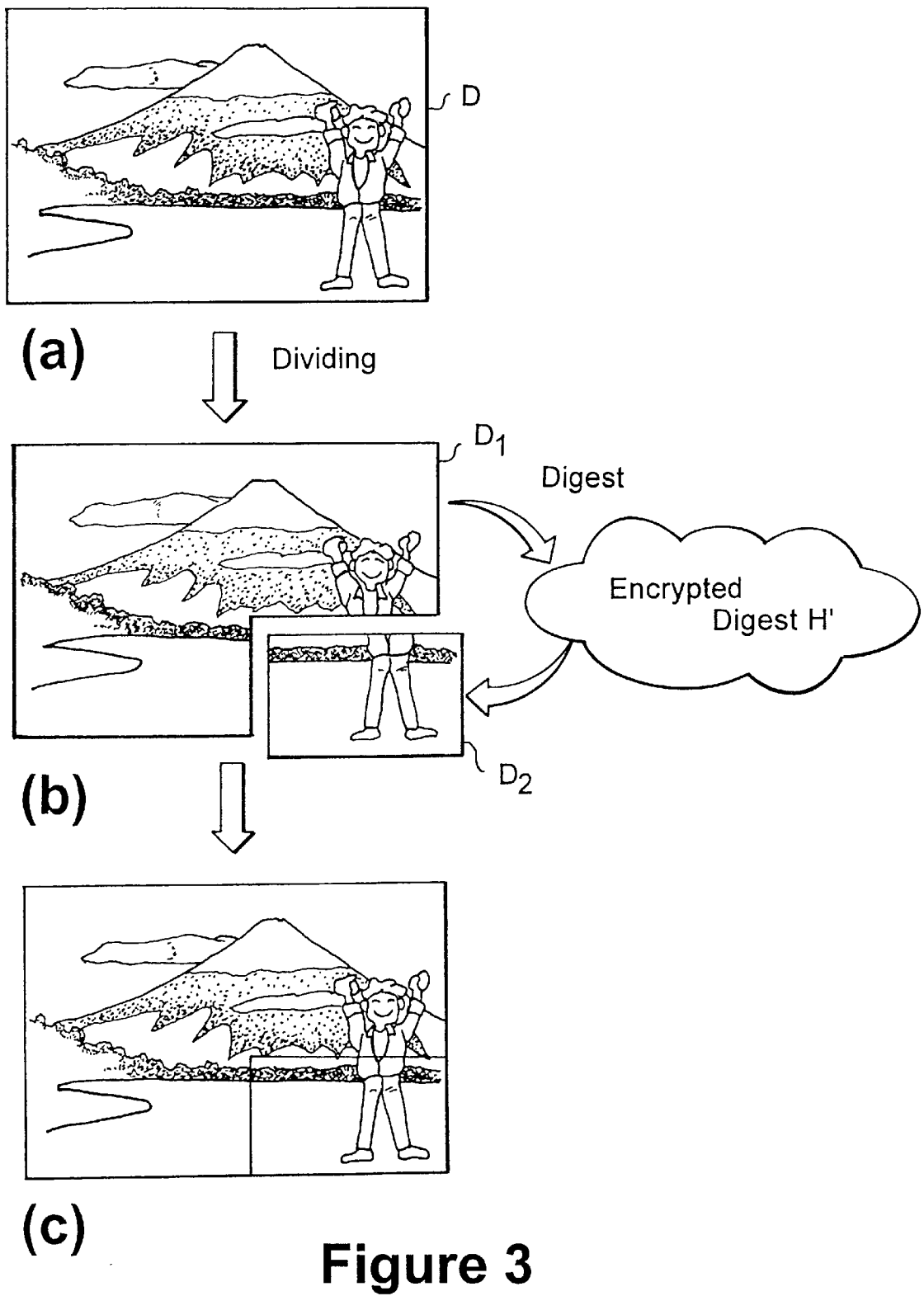
FIG. 3, made up of parts (a)–(c), is a block diagram of the system for detecting the identity of an image in the embodiment.

The image data D, the output of the signal processing unit 23, is cut into two regions by the region dividing unit 24. FIG. 3 is a conceptual view for explaining the division and combination of the image regions. An image D as in (a) of the same figure is divided into an image region $D_1$ giving an input value for generating a hash value, and an image region $D_2$ into which the generated hash value H is embedded (refer to (b) of the same figure). In this embodiment, the image region $D_2$ is formed by 40×40 pixels in the lower-right corner of the image, and ideally, information of 160 bits can be embedded in it. The image region $D_1$ divided by the region dividing unit 24 is inputted to a digest calculating unit 29 as an authentication information generating unit. The digest calculating unit 29 calculates the hash value H of the data in the whole isolated image region $D_1$. The hash value is a digest which shows the characteristics of the image by a calculation based on the image data. The digest is an abstract showing the characteristics of the image data, and the hash value H is characterized by sensitively reacting even to change of one pixel in the image contents and changing to a completely different value. Accordingly, it can be considered that it is a numeric value which has a one-to-one relationship especially with natural image data.

The hash value H is specifically expressed by the following equation.

$$H = H1\ (d[0]//d[1]//d[2]//\ldots//d[I])$$

In the above equation, H1 is a hash function. An operator "//" means the connection of each element of a message array. Further, d[i] indicates each pixel value contained in the image region $D_1$. The concrete calculation for this may be, for instance, exclusive OR of the data belonging to array elements. However, if exclusive OR is used, the sequence of the message array values is not reflected upon the calculation result. For instance, by using a method called CRC (Cyclic Redundancy Check), the sequence relationships can be reflected. This algorithm is one of the algorithms for calculating a check sum, and generates an output depending on the contents of data trains and the sequence of the data trains.

This hash function H1 is a function for calculating for an input (array value d[i]) having a byte length of $B_m$ bytes, an output (hash value) having a different byte length K. Since this function is a unidirectional function, it is effectively impossible to estimate x from y in H(x)=y. The hash value is merely used as the initial value for data hiding, and it is only needed that a different output is effectively ensured for a different input. Thus, the hash value itself has no special meaning. The important thing is that a value representing the characteristics of an array is outputted by its calculation, namely, the hash value is uniquely determined based on the contents of the whole array elements and that value differs depending on the contents of the whole array.

An encrypting unit 30 uses a secret key SK to encrypt the hash value H, and outputs an encrypted hash value H'. The encrypted hash value H' is authentication information. The secret key SK differs for each digital camera, and it is held within the camera.

The hash value H' encrypted as authentication information is sent to the hiding unit 25 in the image processor 27. The hiding unit 25 embeds the hash value H' into the image region $D_2$ by operating data in the image region $D_2$. The embedding can be performed by operating data (for instance, pixel values) in the image region $D_2$ in a real space or a frequency space. There are various methods for the embedding, and concrete examples of them are described later. This is also described in detail in Japanese Patent Application No. 8-159330 and Japanese Patent Application No. 8-272721.

To embed the hash value H' into the image region $D_2$, data in that region is operated, and thus the picture quality in that portion is rather different from the original image. However, since it is almost impossible to visually recognize such difference, there is no visual deterioration of the picture quality.

The region combining unit 26 combines the image region $D_1$ in the original image with the image region $D_2$ in which the hash value H' is embedded (refer to FIG. 3 (c)). Then, the combined image data D' is stored in the memory 28.

As apparent from the above description, the division of the image region is carried out to identify the region for embedding which is not related to the digest calculation. If a digest of the whole image is calculated without dividing the image region, and the result is embedded, then a new digest of the whole image after the embedding is not the same as the embedded original digest. Accordingly by such method, the detection of the identity of the image cannot be performed. Thus, by omitting the image region into which the digest is to be embedded from the digest calculation, the matching between the calculated digest and the embedded digest is ensured. In this viewpoint, the original image D, in which only the image region $D_2$ portion is filled in with a single color such as black or white, may be used as the image region $D_1$. In this case, a digest of the original image D part of which is filled in is calculated, and embedded into the image region $D_2$. By this, the matching between the digests can be ensured even after the embedding.

Further, in the digital camera in this embodiment, additional information such as the ID of the camera used for the photograph taking, time stamp such as the date of photographing, and positional information measured by GPS may be embedded into the image region $D_1$. In this case, it is important that the additional information is embedded into the image region $D_1$ first, and thereafter the resultant hash value H' is embedded into the image region $D_2$. The reason for this is that, if the hash value H' of the image before the embedding of the additional information is embedded into the image region $D_2$, the hash value will be made different by the subsequent embedding of the additional information and the identity cannot be detected.

In addition, the image region $D_2$ need not be concentrated to one portion as in the above embodiment, but it may be made to distributively exist using a positional train generating algorithm, or part of Low Bit may be used.

IMAGE ALTERATION DETECTING SYSTEM

Now, description is made to a system for performing the identity detection of an image photographed by a digital camera, using embedded authentication information. A person wanting to detect the identity needs to have the following information. It is noted that the authentication information is integrally embedded in the image, and thus need not be saved in the form of a separate file.

(1) Image data M'

(2) Public key PK corresponding to a secret key SK (separately acquired from a person in authority)

Figure 4:
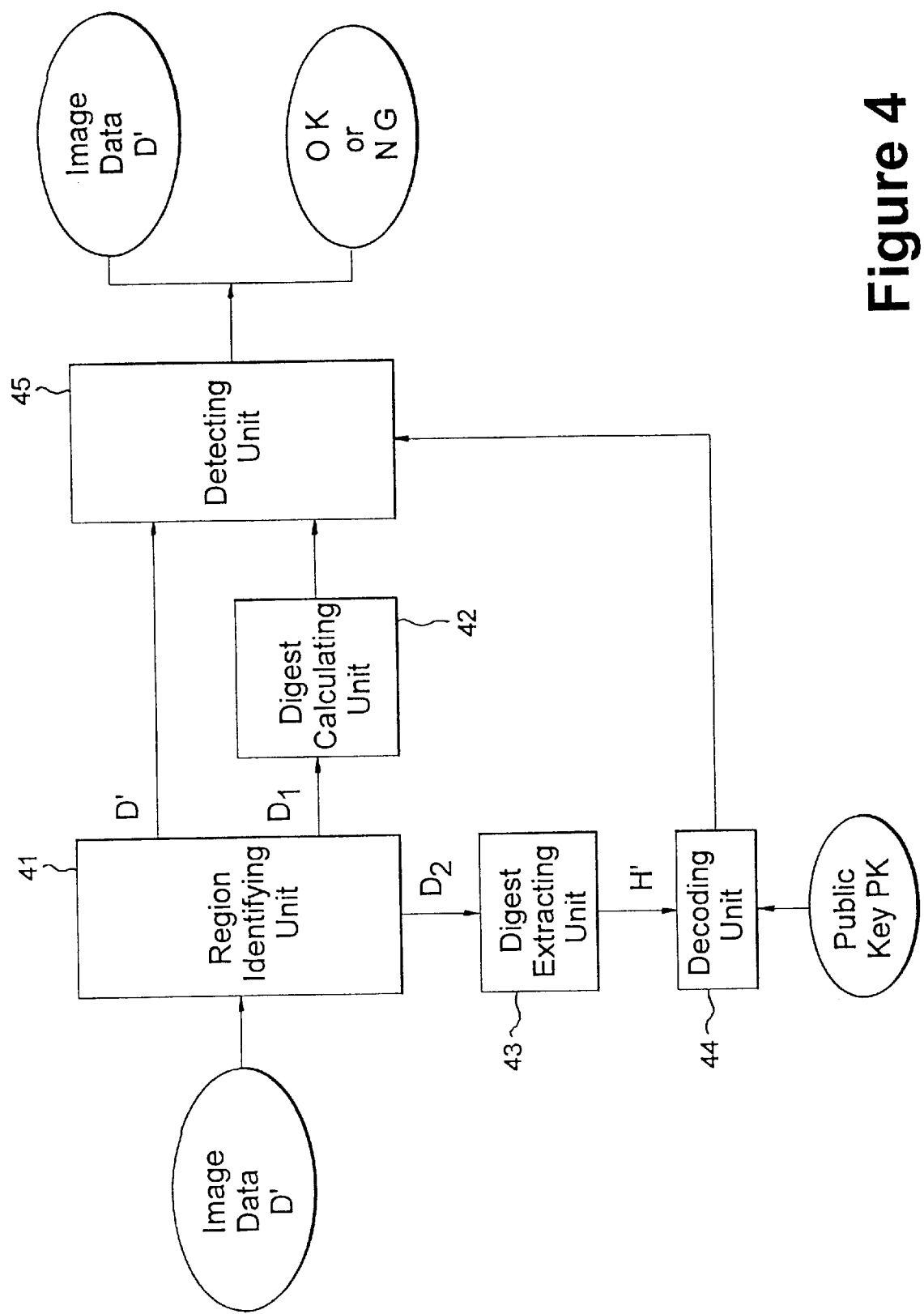
FIG. 4, made up of parts (a)–(c), is a block diagram of the system for detecting the identity of an image in the embodiment.

FIG. 4 is a block diagram of the system for detecting the identity of an image in this embodiment. A region identifying unit 41 identifies an image region $D_1$ and an image region $D_2$ in an image D' in which a hash value H' is embedded. The image region $D_1$ is a region in which data for generating a hash value is stored, and the image region $D_2$ is a region in which the hash value H' as the above described authentication information is embedded.

A digest calculating unit 42 newly calculates a hash value based on data in the image region $D_1$. Further, a digest extracting unit 43 extracts from the image region $D_2$ the encrypted hash value H' which is embedded as authentication information. A specific extraction method is described later along with a specific embedding method.

A decoding unit 44 decodes the extracted hash value H' using a public key PK. The public key PK is an available key which is uniquely determined correspondingly to a secret key SK, and it needs to be acquired from a person in authority who is keeping it.

In a detecting unit 45, the identity is detected by comparing the hash value based on data in the image region $D_1$, which has been newly calculated by the digest calculating unit 42, with the hash value H' obtained by a decoding unit 44. That is if the hash values match with each other it is determined that there is no alteration in the image. Further, if the hash values do not match with each other, it is determined that there is alteration in the image. A mismatch between the hash values occurs at least in one of the following two cases.

(1) Case in which there is alteration in the image region $D_1$ Since the hash value newly remeasured from the image region $D_1$ changes, there is a mismatch between the hash value H embedded in the image region $D_2$.

(2) Case in which there is alteration in the image region $D_2$ Since the hash value H embedded in the image region $D_2$ changes, there is a mismatch between the hash value remeasured from the image region $D_1$.

In accordance with this embodiment, since authentication information is integrally embedded in an image by using a data hiding technique, it is not necessary to attach the authentication information to image data as a separate file. Accordingly, verification can be carried out even if the verifier does not particularly hold the authentication information.

Further, since authentication information is encrypted (scrambled) using a public key encryption system, the rewriting of the authentication information by a malicious third party can effectively be made impossible. Furthermore, a public key PK corresponds to only one secret key SK. Accordingly by making secret key SK different for each digital camera, it is also possible to detect by which digital camera a particular digital image was photographed.

Further, to cope with an illegal access to the information held in the main unit of a digital camera by opening the camera the use of a device such as a tamper-resistant module used in a cellular phone or the like is effective. If such illegal access was made, it would be deemed that the secret key SK was stolen, and for the image data by that secret key SK, it would be determined that there was alteration even if a match is found in the digests. This allows the damage by a third party's illegal action to be avoided.

In addition, although the above embodiment has been described with respect to the digital camera, the present invention is not limited to this, but can naturally apply to a digital system such as digital video.

In this embodiment, description is made to a method for embedding data to be hide into some medium data, and conversely to the pixel Block Coding (hereinafter referred to as PBC), which is an example of the method for extracting embedded data. If the PBC is used, the hiding and extraction of data are handled according to a certain conversion rule as described below.

BASIC ALGORITHM

Generally, the primary characteristics of the pixel values or the like of the two adjacent pixels have a strong correlation with each other. Accordingly, even if the pixel values are substituted for by each other, the image is not degraded to the extent that it is visually recognized. In view of this property, this algorithm hides data of one bit by defining a image region having at least one pixel as a pixel block and intentionally interchanging the characteristic values of the adjacent pixel blocks according to a certain conversion rule. That is, data is expressed by the interchange of the characteristic values of the adjacent pixel blocks. Further, in the data extraction, data is extracted according to an extraction rule determined by the conversion rule.

Bit information is expressed by interchanging the characteristic values (for instance, brightness values) of the two adjacent pixel blocks according to the following conversion rule.

Bit ON <1>: Case in which the characteristic value of one pixel block ($PB_1$) is greater than that of the other one ($PB_2$)
Bit OFF<0>: Case in which the characteristic value of one pixel block ($PB_1$) is smaller than that of the other one ($PB_2$)

Furthermore, bit information is extracted by comparing the characteristic values (for instance, brightness values) of the two adjacent pixel blocks according to the following extraction rule.

Case in which the characteristic value of one pixel block ($PB_1$) is greater than that of the other one ($PB_2$): Bit ON <1>
Case in which the characteristic value of one pixel block ($PB_1$) is smaller than that of the other one ($PB_2$): Bit OFF <0>.

FIG. 5 is a figure for explaining the data hiding and extraction using the PBC. Pixel blocks $PB_1$ and $PB_2$ may be defined as a set of plurality of pixels, for instance, 3×3, or one pixel may also be defined as one pixel block. Since the adjacent pixel blocks has a strong correlation with each other, the image degradation due to the interchange of them would not be felt to the extent that it is visually recognized (FIG. 5 (a)).

A case is considered in which the pixel block positions in the original image are as in (b) of the same figure. First, the characteristic values of the two pixel blocks are compared, and it is assumed that, as a result, the characteristic value of $PB_1$ is greater than that of $PB_2$. If data "1" is hidden in the original, the characteristic values of the pixel blocks are not interchanged, because the characteristic values of the blocks satisfy the condition of data "1" in the conversion rule. Since, in the data extraction, data "1" is specified according to the extraction rule if the characteristic value of $PB_1$ is greater, data "1" is extracted.

On the other hand, if data "0" is hidden in the original, the characteristic values of the pixel blocks are interchanged, because the relationship between the characteristic values of the pixel blocks in the original does not satisfy the condition of data "0" in the conversion rule. However, this interchange cannot be visually recognized. For extraction, data "0" is extracted from the relationship between the characteristic values of these blocks according to the extraction rule.

As described above, in the PBC, a number of pixel blocks enough to hide information to be hidden are selected from the image. Then by making a pallor of one selected pixel block and the pixel block adjacent to it, a train of the pairs is generated. And bits to be hidden are sequentially hidden from the beginning of the train.

This train may be made to correspond to the state sequence S in the first embodiment. For instance, a pixel block is made to correspond to an array element M in the medium array M in the first embodiment. A pair is made by each array element (state value $S_j$) of the state sequence sequentially generated in a hiding work, and the medium array value adjacent to it. Then, the above process may be applied to this pair. Further, it is naturally possible to make a determination on the basis of the sequence of pseudo random numbers generated from the seed of a certain random number.

In the extraction, the same block train as that in the hiding is scanned. By collecting whether the individual pairs represent bit ON or bit OFF on a bit basis according to the extraction rule, the whole message is extracted. If the characteristic values of the pixel blocks forming a pair are the same that pair is skipped as in the hiding. If the block train or the method for generating the train is made to be secret, the hidden information can be put out of a person's sight.

In addition, in the PBC, the position for embedding is preferably determined by considering the picture quality and the extraction precision. That is, if the difference between the characteristic values of the pixel blocks forming the pair to be embedded is too large the picture quality can be degraded by the interchange operation. To suppress such picture quality degradation, it is preferable that a first threshold value (upper limit) is provided, and if the difference between the characteristic values is larger than the threshold value, no bit is embedded in that pair.

Further, if the difference between the characteristic values is small, the picture quality degradation due to the interchange operation hardly occurs, but, conversely, the relationship as to which is greater or smaller is reversed by the effect by noise, and it is feared that the embedded bit cannot be extracted in the extraction step. Accordingly, to suppress the degradation of the extraction precision, it is preferable that a second threshold value (lower limit) is provided, and if the difference between the characteristic values is smaller than the second threshold value, no bit is embedded in that pair.

The pairs corresponding to these cases are skipped without being subjected to any operation. Then, the bit information to be hidden is carried over and hidden with respect to the next pair.

As the characteristic value, the value related to the primary characteristic and the value related to the secondary characteristic of a pixel block can be used. The primary characteristic is a direct parameter of a pixel value such as the brightness or color degree of the pixel block. Further, the secondary characteristic is a value showing statistical nature such as a mean value or dispersion of the parameter which is obtained by decomposing the primary characteristic. Further, the characteristic value may be the calculation result between an array made up of a plurality of pixel values and a predetermined array mask), or may be a particular pixel value obtained by performing a frequency conversion. In general, the primary characteristic has a strong correlation in two adjacent pixel blocks. On the other hand the secondary characteristic can have a strong correlation in two spaced blocks which are not adjacent to each other. Accordingly, it is noted that pixel blocks subjected to the PBC are not always limited to adjacent blocks.

As described above, in accordance with the present invention, since alternation information is supplied in a form in which it is integral with image data, or in a form in which it is embedded in an image, the verifier need not separately store the authentication information. The picture quality of image data is not degraded by such embedding of the authentication information.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A system for embedding authentication information into an image, said system comprising:

a region dividing unit for dividing the image into a first image region and a second image region;

an authentication information generating unit for generating authentication information from data in said first image region;

a hiding unit for embedding said authentication information into said second image region by operating data in said second image region; and a region combining unit for combining said first image region in said image with said second image region in which said authentication information is embedded.

2. A system as set forth in claim 1 wherein said authentication information is a digest of data in said first image region.

3. A system as set forth in claim 2 wherein said digest is a hash value of data in said first image region.

4. A system as set forth in claim 1 further comprising an encrypting unit for encrypting said authentication information, wherein said hiding unit embeds said encrypted authentication information into said second image region.

5. An image alteration detecting system comprising:

a region identifying unit for identifying a first image region and a second image region in an image, said second image region including information embedded by operating data;

an authentication information generating unit for generating first authentication information from data in said first image region;

an extracting unit for extracting second authentication information from said second image region; and an alteration detecting unit for determining, if said first authentication information is the same as said second authentication information, that there is no alteration in said image.

6. A system as set forth in claim 5 wherein said alteration detecting unit determines, if said first authentication information is not the same as said second authentication information that there is alteration in said image.

7. A system as set forth in claim 6 wherein said digest is a hash value of data in said first image region.

8. A system as set forth in claim 5 wherein said first authentication information is a digest of data in said first image region.

9. A system as set forth in claim 5 wherein said second authentication information is encrypted information, said system further comprising a decoding unit for decoding said second authentication information, wherein said alteration detecting unit determines, if said decoded authentication information is the same as said first authentication information, that there is no alteration in said image.

10. A method for embedding authentication information into an image, said method comprising the steps of:

dividing the image into a first image region and a second image region;

generating authentication information from data in said first image region;

embedding said authentication information into said second image region by operating data in said second image region; and combining said first image region in said image with said second image region in which said authentication information is embedded.

11. A method for detecting the identity of an image comprising the steps of:

identifying a first image region and a second image region in the image said second image region including information embedded by operating data in said second image region;

generating first authentication information from data in said first image region;

extracting second authentication information from said second image region; and determining, if said first authentication information is the same as said second authentication information, that there is no alteration in said image.

12. A digital camera comprising:

an optical system;

a converter for converting the light inputted through said optical system to an electric signal so as to output an analog signal of an image;

a signal processing unit for generating a digital signal of the image in response to said analog signal;

a region dividing unit for dividing the image into a first image region and a second image region in response to said digital signal;

an authentication information generating unit for generating authentication information from data in said first image region;

an encrypting unit for encrypting said authentication information;

a hiding unit for embedding the encrypted authentication information into said second image region by operating data in said second image region; and a region combining unit for combining said first image region in said image with said second image region in which said authentication information is embedded.

13. A digital camera as set forth in claim 12 wherein said authentication information is a hash value of data in said first image region.

* * * * *

UNITED STATES PATENT AND TRADEMARK OFFICE
CERTIFICATE OF CORRECTION

PATENT : 6,005,936

DATED : December 21, 1999

INVENTOR(S) : Shuichi Shimuzi, et al.

It is certified that error appears in the above-identified patent and that said Letters Patent is hereby corrected as shown below:

On the Title Page, under "OTHER PUBLICATIONS", line 5:
"Tay" should read --Jay--

On the Title Page, after Section [76], insert the following:
--[73] Assignee: International Business Machines
Corporation, Armonk, N.Y. --

Column 3, line 44: delete "made up of parts (a)-(c),"

Column 3, line 47: delete "made up of parts (a)-(c),"

Figure 5A:
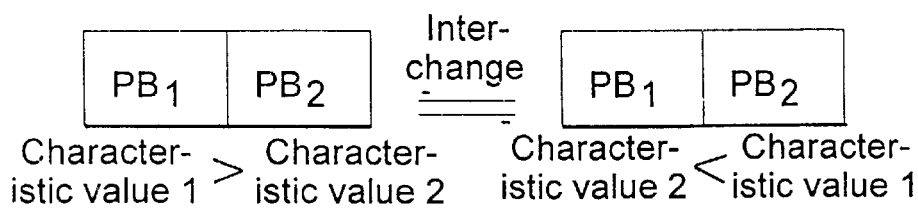
FIG. 5 is a figure for explaining the data hiding and extraction using the PBC.
Figure 5B:
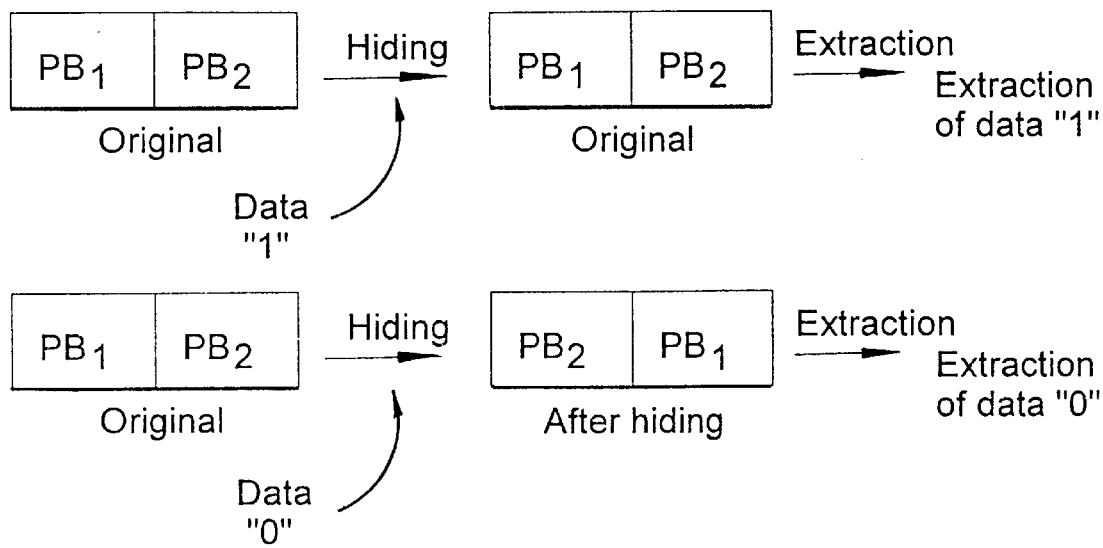
Figure 5C:
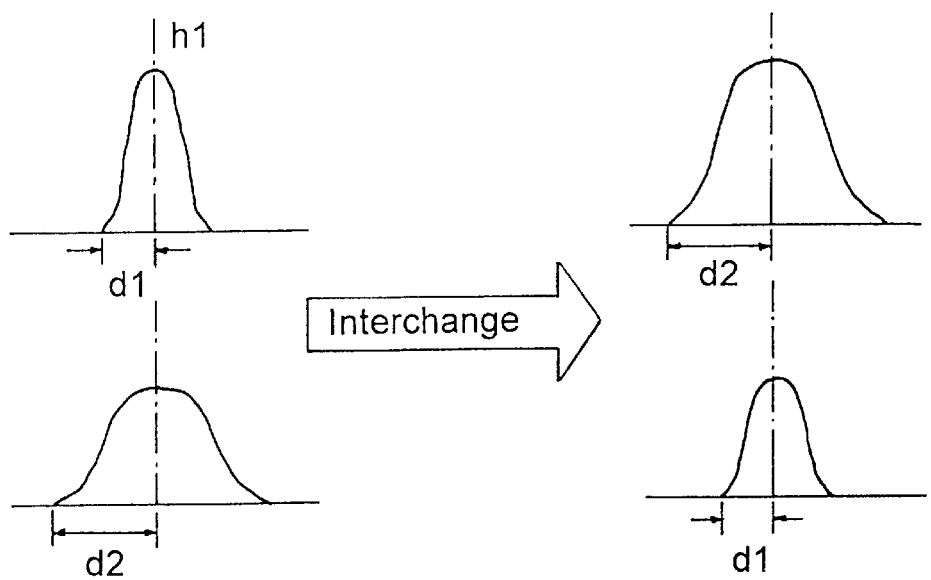

Column 3, line 51: "FIG. 5 is a figure for" should read --Figures 5(a), 5(b), and 5(c) are figures for--

Column 7, line 5: after "($PB_2$)" insert --.--

Column 7, line 37: "Fig. 5 is a figure for" should read --Figures 5(a), 5(b) and 5(c) are figures for--

Column 7, line 46: "in (b) of the same figure." should read --shown in Figure 5(b).--

Signed and Sealed this

Fifteenth Day of May, 2001

*Attest:*

NICHOLAS P. GODICI

*Attesting Officer*    Acting Director of the United States Patent and Trademark Office